United States Patent
Yang et al.

(10) Patent No.: US 6,866,179 B2
(45) Date of Patent: Mar. 15, 2005

(54) DETACHABLE WELDING TAB ASSEMBLY

(76) Inventors: Chien-Chang Yang, No. 80, Ho-Ping Lane, Hsien-Ho Li, Kang-Shan Chen, Kaohsiung Hsien (TW); Marlon Chen, No. 40, Lane 85, Chungtu St., Kaohsiung (TW)

( * ) Notice: Subject to any disclaimer, the term of this patent is extended or adjusted under 35 U.S.C. 154(b) by 277 days.

(21) Appl. No.: 10/254,716

(22) Filed: Sep. 24, 2002

(65) Prior Publication Data

US 2003/0057254 A1 Mar. 27, 2003

(30) Foreign Application Priority Data

Sep. 25, 2001 (TW) ........................................ 90123563 A (51) Int. Cl.[7] ............................................. B23K 20/14
(52) U.S. Cl. .......................................... 228/41; 228/50
(58) Field of Search ............................ 228/41, 50, 125, 228/215, 216, 212, 213, 44.3, 44.5; 219/73.1, 161, 158; 269/47, 49, 315, 10

(56) References Cited

U.S. PATENT DOCUMENTS

| | | | | |
|---|---|---|---|---|
| 3,558,845 A | * | 1/1971 | Norcross | 219/73.1 |
| 4,151,389 A | * | 4/1979 | Hirsch et al. | 219/73.1 |
| 4,315,127 A | * | 2/1982 | Ito et al. | 219/73.1 |
| 4,360,141 A | * | 11/1982 | Kensrue | 228/46 |
| 5,820,718 A | * | 10/1998 | Dean | 156/211 |
| 6,161,750 A | * | 12/2000 | Yang et al. | 228/50 |

\* cited by examiner

*Primary Examiner*—Jonathan Johnson
(74) *Attorney, Agent, or Firm*—Dellett & Walters (57) ABSTRACT

A welding tab assembly has a weld tab and a metal rod. The weld tab has an inverted L-shaped recess defined in one side of the weld tab and an inclined hole defined in a top face of the recess. The metal rod is inverted L-shaped and is received in the inverted L-shaped recess. An inclined section obliquely extends from one end of the metal rod and is received in the inclined hole in the weld tab. A fastener detachably holds the metal rod in the recess. In such an arrangement, the welding slag can be cleaned or exhausted during the welding process by means of detaching the weld tab from the welded parts, such that the welding quality is improved.

14 Claims, 11 Drawing Sheets

DETACHABLE WELDING TAB ASSEMBLY

BACKGROUND OF THE INVENTION

1. Field of the Invention

The present invention relates to a welding tab assembly, and more particularly to a detachable welding tab assembly that can exhaust the welding slag during the welding process by means of detaching the welding tab assembly.

2. Description of Related Art

To prevent the welding material running out from the two sides of a welding bead between two parts, two weld tabs are respectively attached to two sides of the two parts to define a closed welding bead between the two parts. A conventional weld tab in accordance with the prior art comprises a body made of a ceramic material. A clamping device is arranged to clamp the weld tabs. The clamping device has two magnetic devices and two resilient flats attached to the magnetic device. When welding the two parts, a welder must attach a pad behind the welding bead by an adhesive tape and put the magnetic devices of the clamping device on the sides of the parts. Then the weld tabs are clamped by the two resilient flats and contains a closed welding bead formed between the two parts.

However, the resilient flats of the clamping device easily develop elastic fatigue and lose the elastic force after having been used for a long time. In addition, the welding of most large parts usually needs to be repeated several times in order to make sure that the parts are securely welded. Because the weld tabs are made of a ceramic material, the conventional weld tabs cannot combine with the welding material so as to only provide a side limitation effect to the welding material. There is no steady device between the weld tabs and the parts to prevent the tabs from detaching except clamping member. So the conventional weld tab is not very convenient in use.

Figure 10:
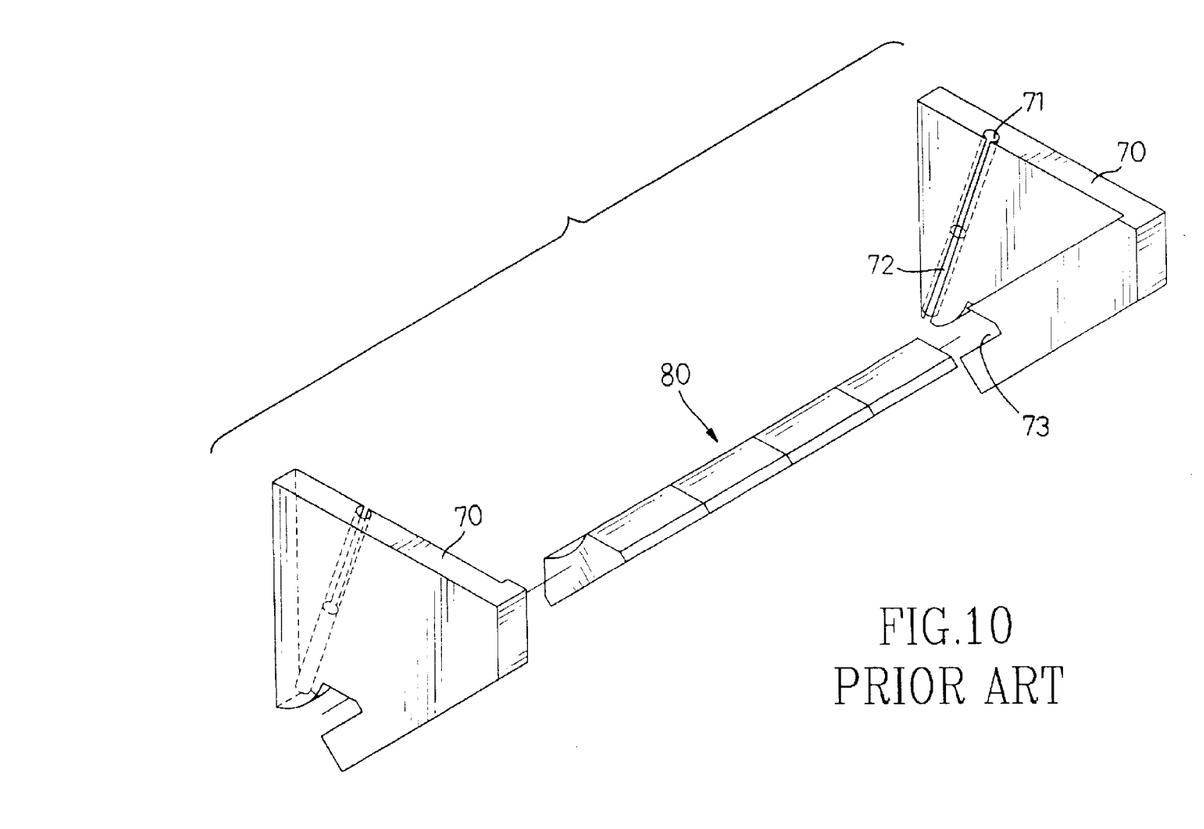
FIG. 10 is an exploded perspective view of two weld tabs in accordance with the prior art with a pad.
Figure 11:
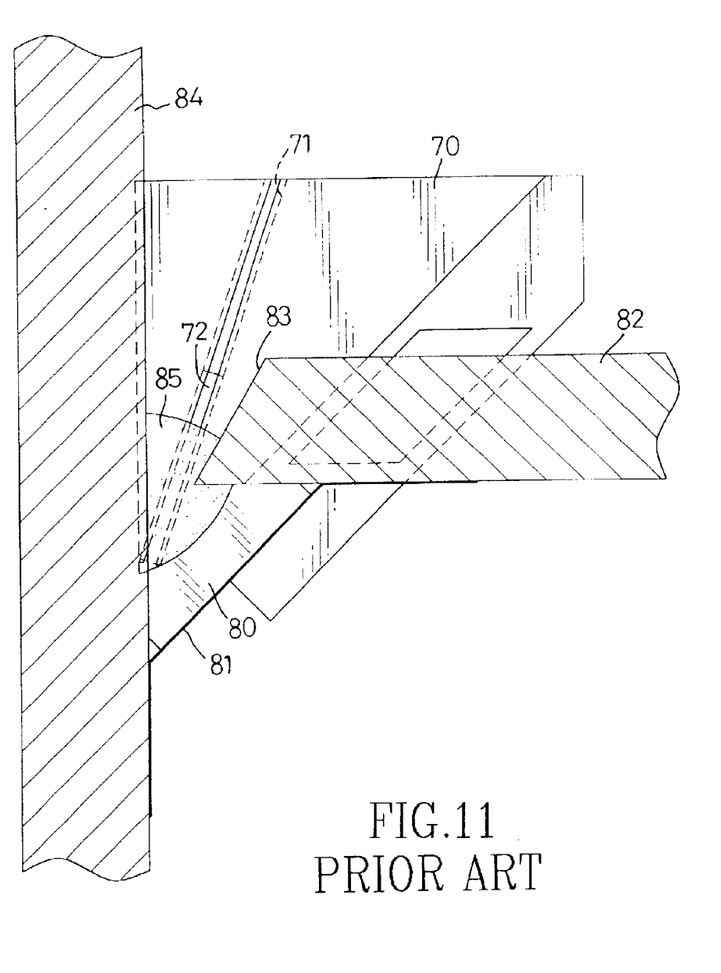
FIG. 11 is a side plan view in partial cross section of the weld tab in FIG. 10 applied to a welding process.

With reference to FIGS. 10 and 11, another conventional weld tab (70) in accordance with the prior art comprises a body with a notch (73) defined in a bottom of the body. A groove (71) with an opening is defined in each tab (70) at a side facing the other tab (70). A metal stick (72) is received in the groove (71). A pad (80) is mounted between two weld tabs (70) and is engaged in the notches (73) in the weld tabs (70). An adhesive tape (81) is attached to two welded parts (82,84) and the pad (80) so as to support the pad (80) and the weld tabs (70) on the welded parts (82,84).

When the welding process is started, the metal stick (72) received in the groove (71) will be melted to mix with the welding material (85). Accordingly, the weld tab (70) is securely held between the parts (82,84) even if the adhesive tape (71) detaches from the pad (80) or the pad (80) falls due to gravity. Consequently, the weld tab (70) still securely closes the two sides of the welding bead (83) to prevent the welding material (85) from side leaking until the welding work is finished.

However, the conventional weld tab (70) cannot be detached from the welded parts (82,84) during the welding process. Welding slag occurring during the welding process cannot be cleaned or exhausted because of the undetachable weld tabs (70), such that the welding slag will be combined with the welding material (85) in the welding process. Therefore, the welding quality applied with the conventional weld tabs (70) is lowered.

To overcome the shortcomings, the present invention tends to provide a detachable welding tab assembly to mitigate or obviate the aforementioned problems.

SUMMARY OF THE INVENTION

The main objective of the invention is to provide a welding tab assembly that can exhaust the welding slag produced during the welding process. The welding tab assembly has a weld tab and a metal rod. The weld tab has an inverted L-shaped recess defined in one side of the weld tab and an inclined hole defined in a top face of the recess. The metal rod is inverted L-shaped and is received in the inverted L-shaped recess. An inclined section obliquely extends from one end of the metal rod and is received in the inclined hole in the weld tab. A fastening means is provided for detachably holding the metal rod in the recess. Accordingly, the welding slag can be exhausted during the welding process by means of detaching the weld tab from the welded parts, such that the welding quality is improved.

Other objects, advantages and novel features of the invention will become more apparent from the following detailed description when taken in conjunction with the accompanying drawings.

DETAILED DESCRIPTION OF PREFERRED EMBODIMENT

Figure 1:
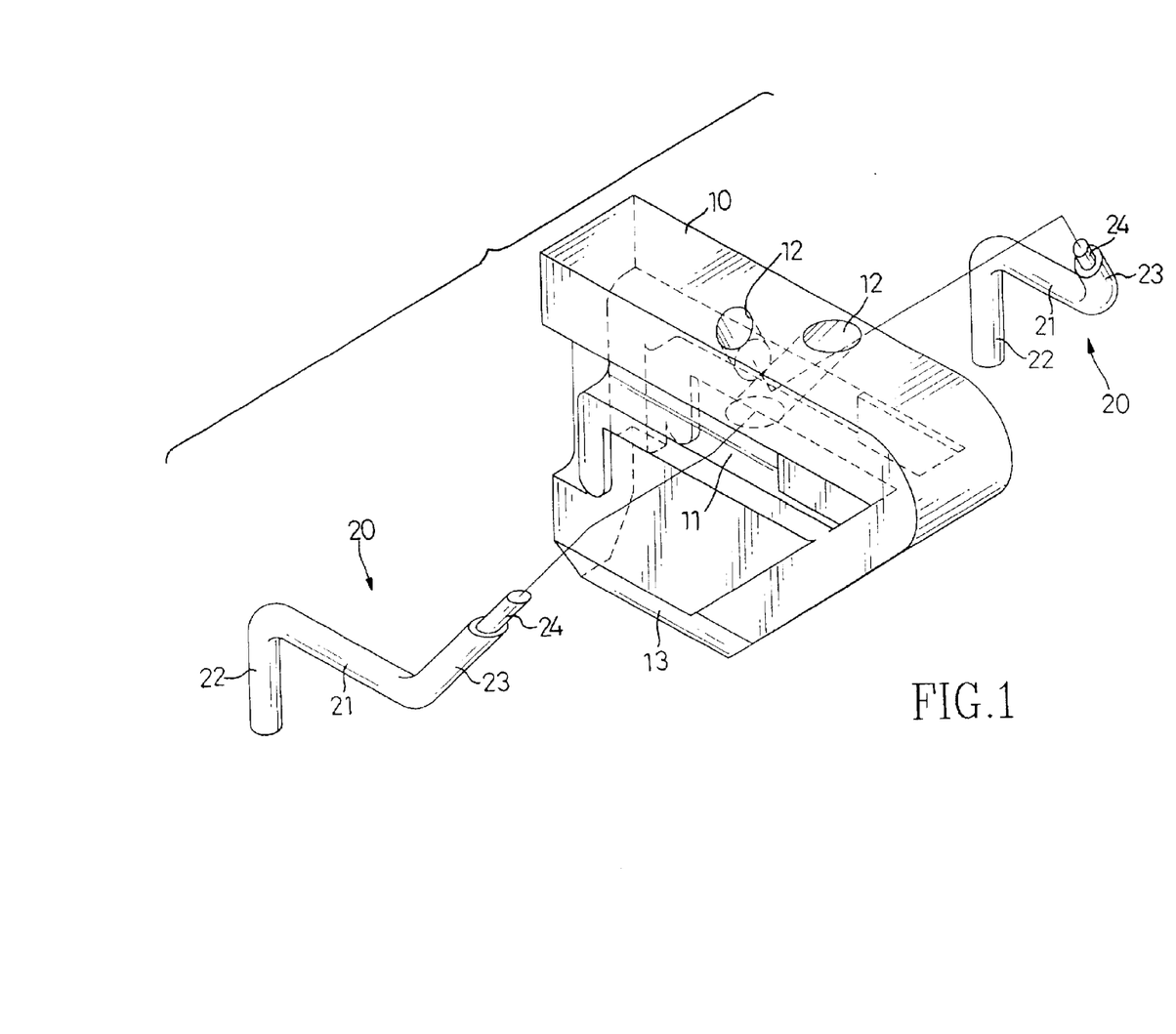
FIG. 1 is an exploded perspective view of a first embodiment of a welding tab assembly in accordance with the present invention.
Figure 2:
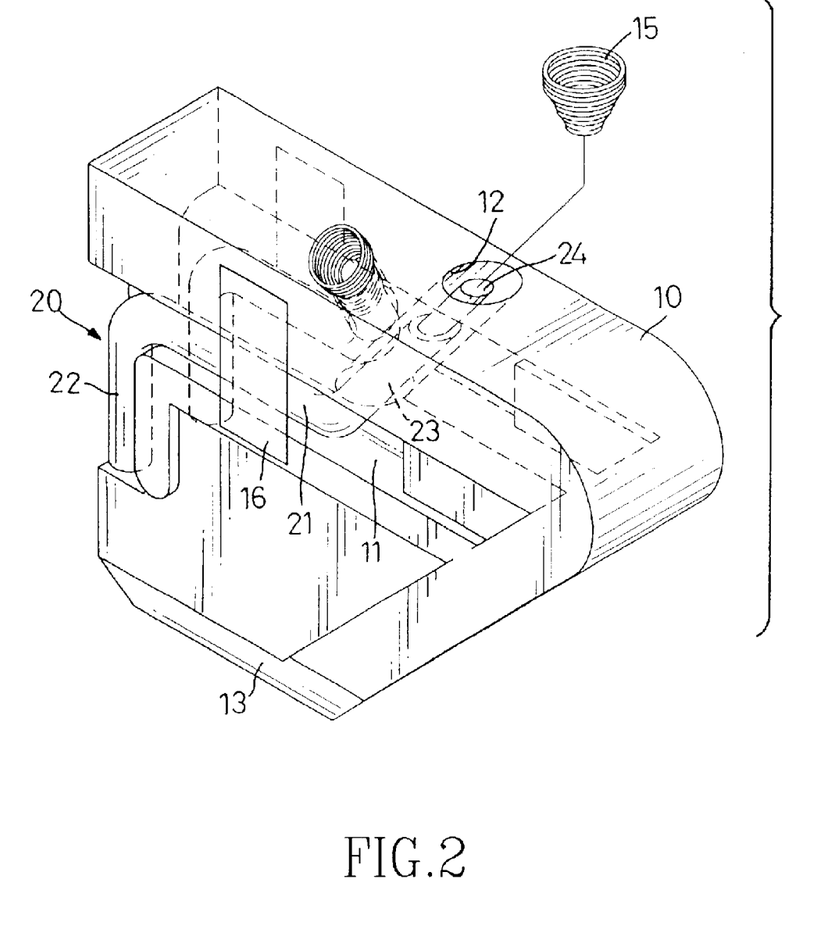
FIG. 2 is a perspective view of the first embodiment of the welding tab assembly in FIG. 1.

With reference to FIGS. 1 and 2, a welding tab assembly in accordance with the present invention comprises a weld tab (10), a metal rod (20) and a fastening device. The weld tab (10) has an inverted L-shaped recess (11) defined in each side of the weld tab (10) and an inclined hole (12) defined in a top face of each recess (11). In practice, the weld tab (10) has only one recess (11) defined in one side of the weld tab (10) to fit with different welding conditions. An inclined cutaway (13) is defined in each side at the bottom of the weld tab (10).

The inverted L-shaped metal rods (20) are respectively received in the inverted L-shaped recesses (11) in the weld tab (10). The metal rod (20) has a lateral section (21) and a leg section (22) vertically extending downward from one end of the lateral section (21). The metal rod (20) further has an inclined section (23) inclinedly extending from the metal rod (20) at the end far from the leg section (22). The inclined section (23) is inserted into the inclined hole (12) in the weld tab (10). The fastening device is mounted on the weld tab (10) to detachably hold each metal rod (20) in the corresponding recess (11).

In a first embodiment, the fastening device comprises a stub (24) and a fastener (15). The stub (24) integrally extends from the top end of the inclined section (23) of the metal rod (20) and has a diameter smaller than that of the inclined section (24). The fastener (15) is a spring-shaped flexible fastener received in the inclined hole (12) in the weld tab (20) and is mounted around the stub (24) on the metal rod (20), wherein the inclined hole (12) extends through the top of the weld tab (10). In assembling, the fastener (15) is inserted into and pressed into the inclined hole (12) from the top of the weld tab (10), and the stub (24) on the metal rod (20) is pressed into the fastener (15). With the engagement provided by the spring-shaped fastener (20), the metal rod (20) is securely held in the recess (11).

In the second embodiment, the fastening device is an adhesive tape (16) attached to the first side of the weld tab (10) and corresponding to the metal rod (20). Accordingly, the metal rod (20) is securely held in the recess (11) by the adhesive tape (16).

Figure 3:
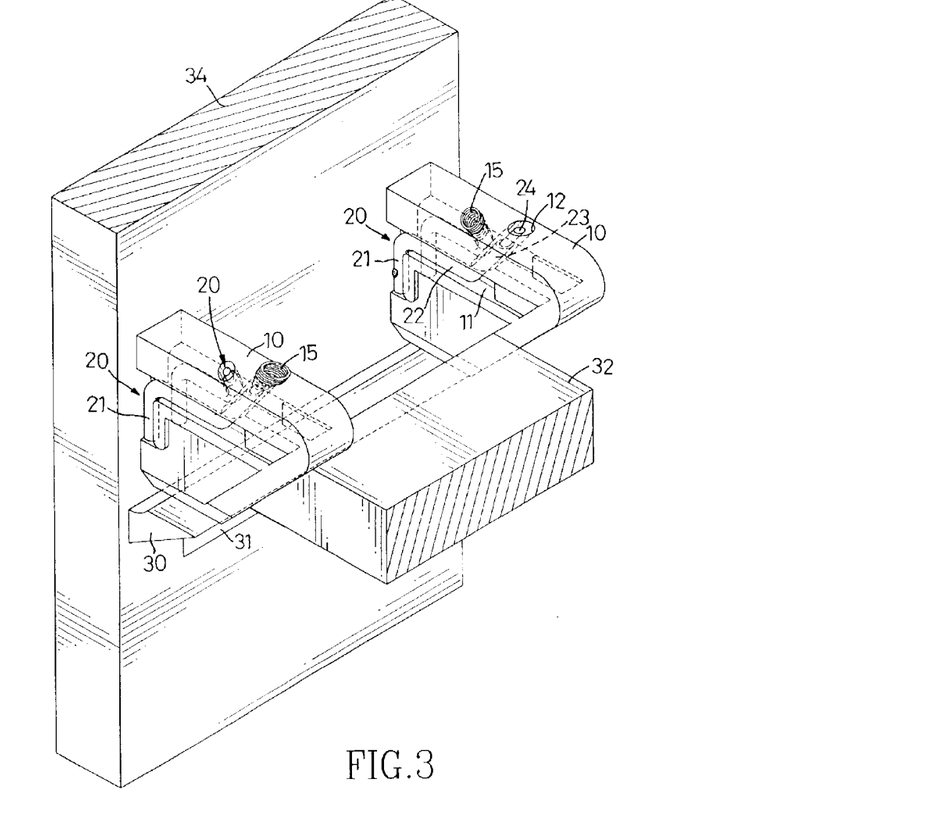
FIG. 3 is a perspective view of two welding tab assemblies in FIG. 1 applied to two welded parts during a welding process.
Figure 5:
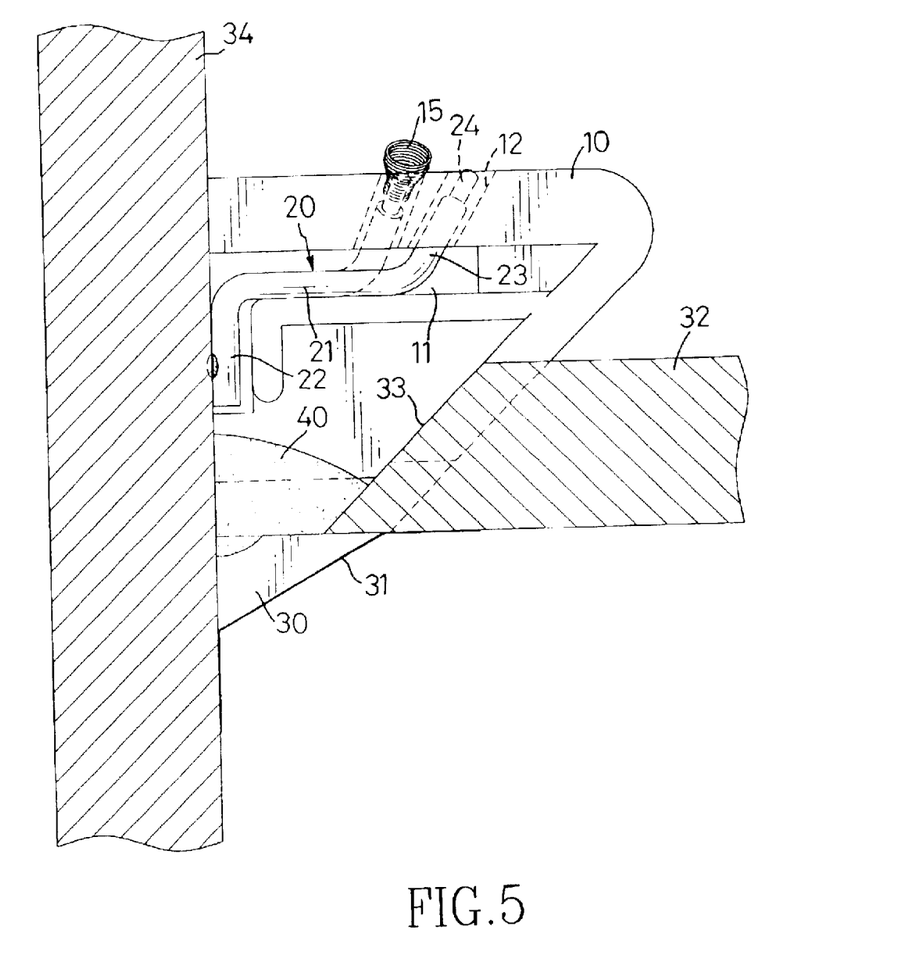
FIG. 5 is a side plan view in partial cross section of the welding tab assembly in FIG. 1 applied to a welding process.
Figure 6:
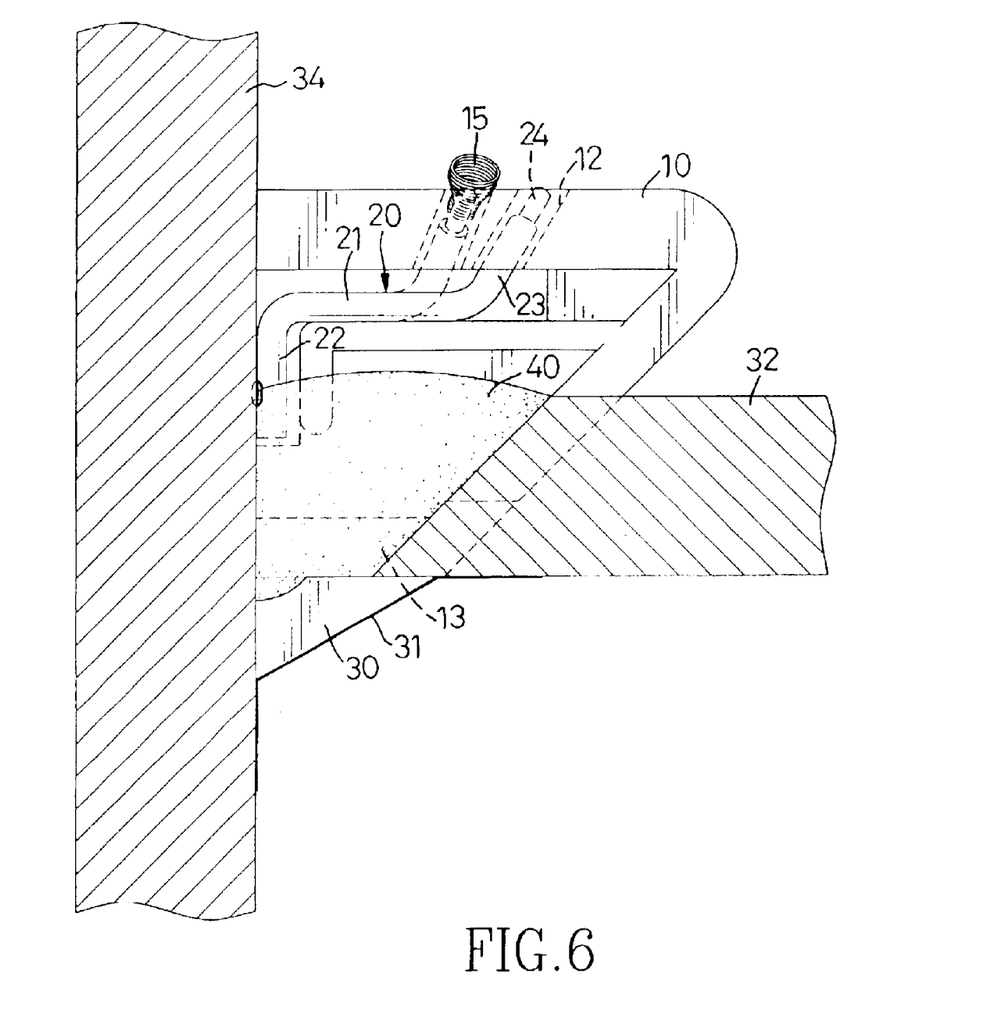
FIG. 6 is a side plan view in partial cross section of the welding tab assembly in FIG. 1 applied to a welding process that is repeated several times.

In use, with reference to FIGS. 3, 5 and 6, the metal rod (20) is firstly secured attached to one of the welded parts (34) by means of a spot welding process between the part (34) and the leg section (21) of the metal rod (20). The metal rod (20) is then received in the recess (11), and the inclined section (23) is inserted into the inclined hole (12) in the weld tab (10). After attaching the fastening device onto the weld tab (10), the weld tab (10) will be securely attached onto the welded part (34) with the metal rod (20). A pad (30) is attached to the welded parts (32,34) by an adhesive tape (31) and is located below the gap between the welded parts (32,34), such that a closed welding bead (33) is defined between the two welded parts (32,34), the two weld tabs (10) and the pad (30). The welding material (40) is melted and fills in the welding bead (33) to weld the two parts (32,34) together. With the arrangement of the weld tabs (10), the welding material (40) is prevented from running out from the two sides of the welding bead (33).

Figure 4:
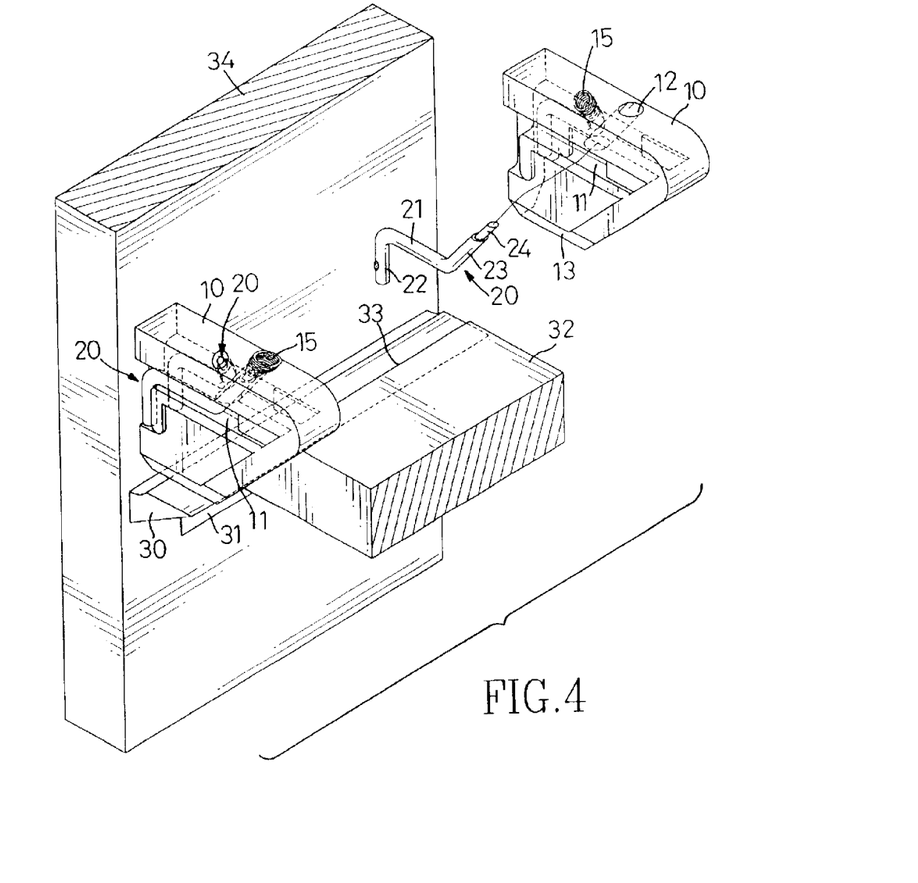
FIG. 4 is an operational perspective view of two welding tab assemblies in FIG. 1 applied to two welded parts showing that one of the weld tabs is detached from the welded part.

If the user wants to clean or exhaust the welding slag occurring during the welding process, the fastening device is firstly detached from the weld tab (10). With reference to FIG. 4, the weld tab (10) can be detached from the metal rod (20) by means of inclinedly moving the weld tab (10) relative to the metal rod (20) so as to make the corresponding end of the welding bead (33) open. Consequently, the welding slag can be cleaned or exhausted from the opened end of the welding bead (33). After the welding slag being cleaned or exhausted, the weld tab (10) is then attached to the metal rod (20), and the fastening device is attached to the weld tab (10) again for a subsequent welding process being applied. Accordingly, the welding slag is kept from being combined with the welding material (40) in the subsequent welding process. Thus, the welding quality is improved by the presently disclosed invention.

When the welding material (40) sinks the welding spot between the metal rod (20) and the welded part (34), the welding spot will be melted and combined with the welding material (40). Accordingly, the metal rod (20) will automatically detach from the welded part (34), such that the welding process is done. Therefore, the position of the welding spot between the metal rod (20) and the welded part (34) is predetermined according to the desired thickness of the welding material (40).

In addition, with the arrangement of the cutaway (13) at the bottom of the weld tab (10), the welding material (40) can fill the welding bead (33) fully, such that the combination between the two parts (32,34) is enhanced.

Figure 7:
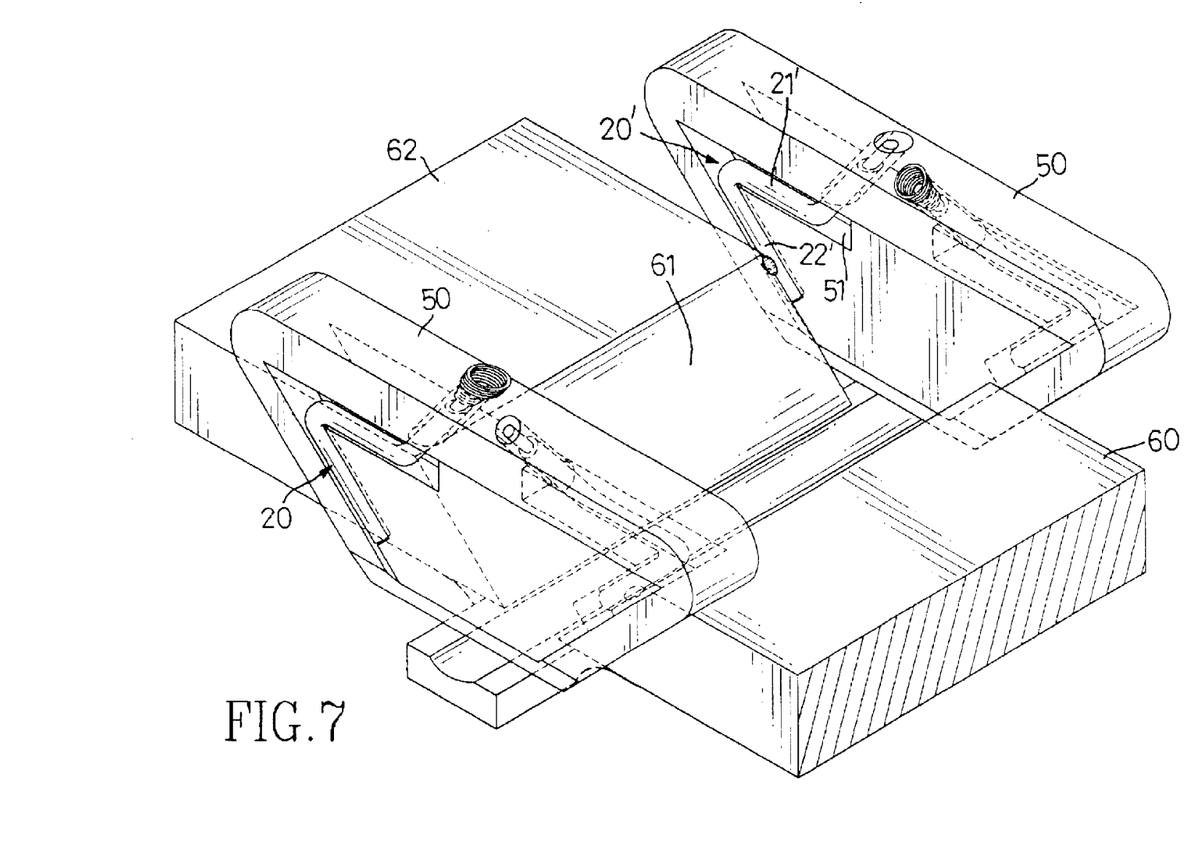
FIG. 7 is a perspective view of a second embodiment of a welding tab assembly in accordance with the present applied to a welding process.

With reference to FIG. 7, the weld tab (50) can also be applied to weld two welded parts (60,62) in parallel to defined a closed welding bead (61) between the two parts (60,62). In the embodiment of the welding tab assembly shown in FIG. 7, the leg section (22') of the metal rod (20) is not perpendicular to the lateral rod (21') and has an acute angle between the lateral section (21') and the leg section (22'). Accordingly, the recess (51) defined in the weld tab (50) has a shape with an acute angle corresponding to the acute angle on the metal rod (20').

Figure 8:
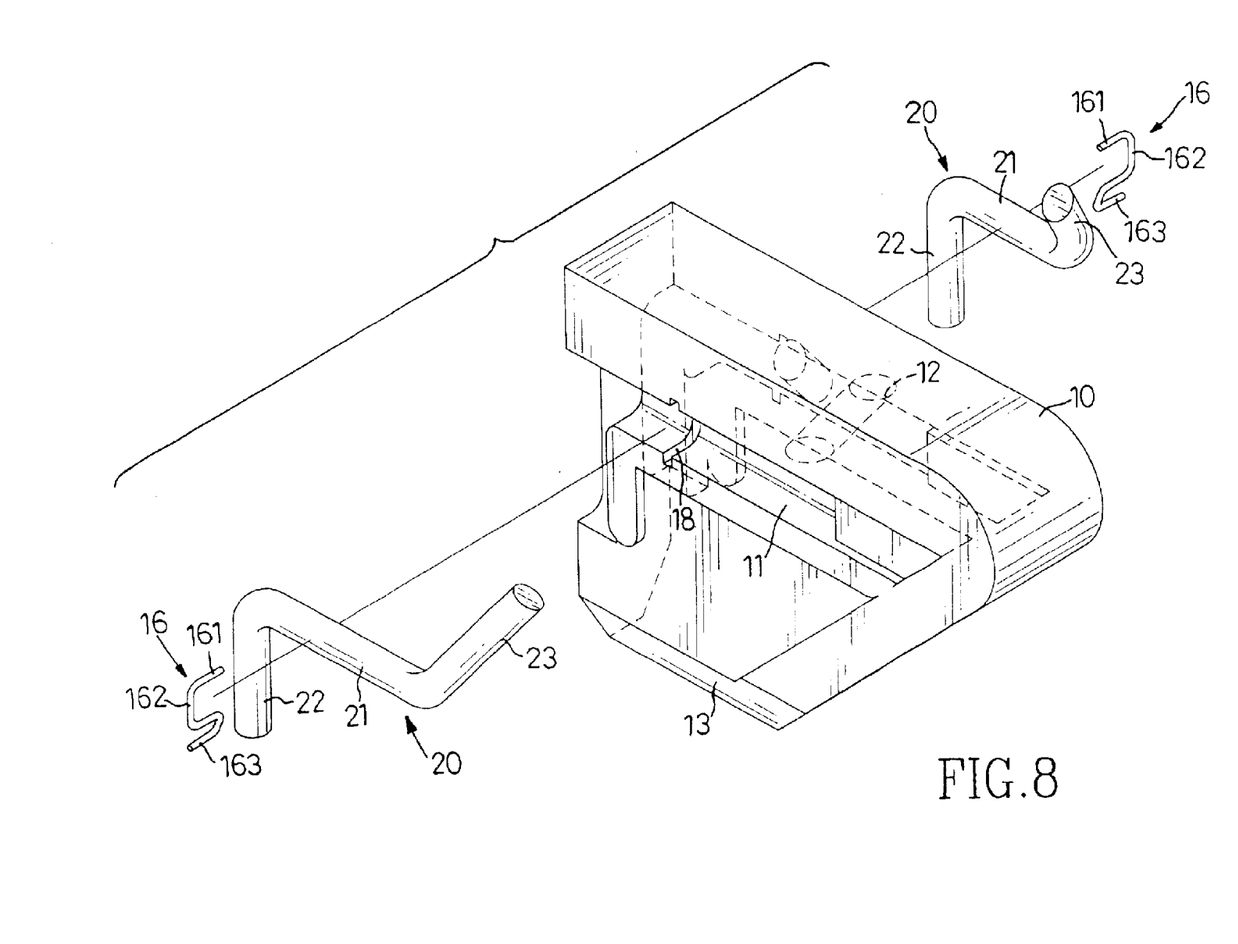
FIG. 8 is an exploded perspective view of a third embodiment of a welding tab assembly in accordance with the present invention.
Figure 9:
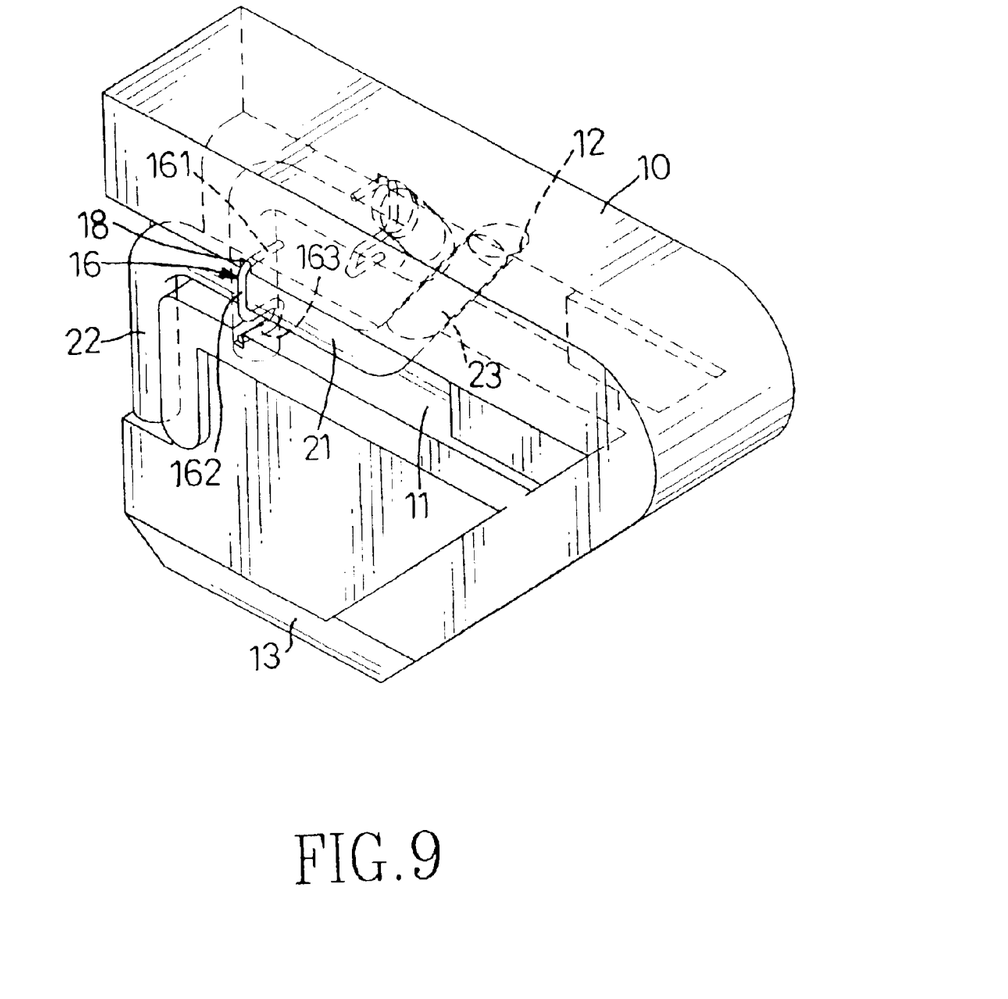
FIG. 9 is a perspective view of the third embodiment of the welding tab assembly in FIG. 8.

With reference to FIGS. 8 and 9, the fastening device comprises a U-shaped groove (18) defined in an inner surface of the recess (11) and an S-shaped fastener (16) securely received in the U-shaped groove (11) to hold the metal rod (20) in the recess (11). The fastener (16) has a longitudinal holding section (162), an upper lateral section (161) and an inverted U-shaped lower lateral section (163). The upper and lower lateral sections (161,163) respectively extend from two ends of the holding section (162). To attach the fastener (16) to the weld tab (10), the upper lateral section (161) and the lower lateral section (163) are respectively inserted into two ends of the U-shaped groove (18). The holding section (162) will abut the lateral section (21) of the metal rod (20), such that the metal rod (20) is securely held in the recess (11) by the fastener (16). With the arrangement of the U-shaped lower lateral section (163), a resilient effect is provided to the fastener (16), such that the fastener (16) is easily attached to or detached from the groove (11).

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A welding tab assembly comprising:
    a weld tab having a first side, a second side, a top, a bottom, a recess defined in the first side of the weld tab and an inclined hole defined in a top face of the recess;
    a metal rod received in the recess and having a lateral section, a leg extending downward from one end of the lateral section and an inclined section obliquely extending from the other end of the metal rod and received in the inclined hole in the weld tab; and
    a fastening means for detachably holding the metal rod in the recess.

2. The welding tab assembly as claimed in claim 1, wherein the fastening means comprises a stub extending from the inclined section of the metal rod and a spring-shaped flexible fastener received in the inclined hole in the tab and mounted around the stub on the metal rod,
    wherein the inclined hole extends through the top of the tab.

3. The welding tab assembly as claimed in claim 1, wherein the fastening means is an adhesive tape attached to the first side of the tab and corresponding to the metal rod.

4. The welding tab assembly as claimed in claim 1, wherein the fastening means comprises a U-shaped groove defined in an inner surface of the recess and an S-shaped fastener securely received in the U-shaped groove to hold the metal rod in the recess.

5. The welding tab assembly as claimed in claim 1, wherein the tab has an inclined cutaway defined in the first side at the bottom of the tab.

6. The welding tab assembly as claimed in claim 1, wherein the recess in the weld tab is inverted L-shaped, and the leg section is perpendicular to the lateral section.

7. The welding tab assembly as claimed in claim 1, wherein the metal rod has an acute angle between the lateral section and the leg section, and the recess in the weld tab has a shape with an acute angle corresponding to the acute angle of the metal rod.

8. A welding tab assembly comprising:
- a weld tab having a first side, a second side, a top, a bottom, a recess defined in each side of the weld tab and an inclined hole defined in a top face of each recess;
- two metal rods respectively received in the recesses and each having two ends, a lateral section, a leg extending downward from one end of the lateral section and an inclined section inclinedly extending from the other end of the metal rod and received in the inclined hole in the weld tab; and
- a fastening means for detachably holding the metal rod in the corresponding recess.

9. The welding tab assembly as claimed in claim 8, wherein each fastening means comprises a stub extending from the inclined section of the corresponding one of the metal rods and a spring-shaped flexible fastener received in the corresponding one of the inclined holes in the tab and mounted around the stub on the corresponding metal rod, wherein the inclined hole extends through the top of the tab.

10. The welding tab assembly as claimed in claim 8, wherein each fastening means is an adhesive tape attached to each side of the tab and corresponding to the corresponding one of the metal rods.

11. The welding tab assembly as claimed in claim 8, wherein each fastening means comprises a U-shaped groove defined in an inner surface of each recess and an S-shaped fastener securely received in each U-shaped groove to hold the corresponding one of the metal rods in the recess.

12. The welding tab assembly as claimed in claim 8, wherein the tab has an inclined cutaway defined in each side at the bottom of the tab.

13. The welding tab assembly as claimed in claim 8, wherein the recess in the weld tab is inverted L-shaped, and the leg section is perpendicular to the lateral section.

14. The welding tab assembly as claimed in claim 8, wherein the metal rod has an acute angle between the lateral section and the leg section, and the recess in the weld tab has a shape with an acute angle corresponding to the acute angle of the metal rod.

* * * * *